United States Patent
Yang et al.

(10) Patent No.: US 8,976,138 B2
(45) Date of Patent: Mar. 10, 2015

(54) TOUCH DISPLAY DEVICE

(71) Applicant: HTC Corporation, Taoyuan County (TW)

(72) Inventors: Syuan-Ling Yang, Taoyuan County (TW); Chih-Jen Hu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 74 days.

(21) Appl. No.: 13/712,999

(22) Filed: Dec. 13, 2012

(65) Prior Publication Data

US 2013/0300717 A1    Nov. 14, 2013

Related U.S. Application Data

(60) Provisional application No. 61/643,914, filed on May 8, 2012.

(51) Int. Cl.
*G06F 3/041* (2006.01)
*G02F 1/1333* (2006.01)
*G02F 1/13363* (2006.01)

(52) U.S. Cl.
CPC ............ *G06F 3/041* (2013.01); *G02F 1/13338* (2013.01); *G02F 2001/133638* (2013.01)
USPC ......................................... 345/173; 345/156

(58) Field of Classification Search
CPC . G02F 1/13338; G02F 1/00; G02F 1/133528; G02F 2001/133541; G06F 2203/04103
USPC ........ 345/173, 156; 359/483.01; 349/117, 96, 349/115
See application file for complete search history.

(56) References Cited

U.S. PATENT DOCUMENTS

| | | | |
|---|---|---|---|
| 6,611,299 B1 | 8/2003 | Fujii et al. | |
| 8,139,042 B2* | 3/2012 | Iljima | 345/173 |
| 2001/0008433 A1 | 7/2001 | Fujii et al. | |
| 2004/0075779 A1 | 4/2004 | Paukshto et al. | |
| 2005/0249890 A1* | 11/2005 | Murakami et al. | 428/1.1 |
| 2006/0152640 A1 | 7/2006 | Tanabe et al. | |
| 2008/0246904 A1 | 10/2008 | Cho et al. | |
| 2010/0214264 A1 | 8/2010 | Kuo et al. | |
| 2011/0227835 A1 | 9/2011 | Lin | |

FOREIGN PATENT DOCUMENTS

| | | |
|---|---|---|
| TW | 200732748 | 9/2007 |
| TW | 201211619 | 3/2012 |

OTHER PUBLICATIONS

"Office Action of Taiwan Counterpart Application", issued on Dec. 3, 2014, p.1-p.5.

* cited by examiner

*Primary Examiner* — Amare Mengistu
*Assistant Examiner* — Shawna Stepp Jones
(74) *Attorney, Agent, or Firm* — Jianq Chyun IP Office

(57) ABSTRACT

A touch display device including a display module and a touch module is provided. The touch module is disposed above the display module and includes a transparent cover, a touch electrode layer and a phase retardation protection layer. The display module is configured to provide an image light. The touch-sensing layer is disposed on the transparent cover and between the display module and the transparent cover. The phase retardation protection layer covers the touch-sensing layer. A polarization direction of the image light provided by the display module is changed after passing through the phase retardation protection layer. A touch display device including a phase retardation planarization layer is also provided.

11 Claims, 6 Drawing Sheets

TOUCH DISPLAY DEVICE

CROSS-REFERENCE TO RELATED APPLICATION

This application claims the priority benefits of U.S. provisional application Ser. No. 61/643,914, filed on May 8, 2012. The entirety of the above-mentioned patent applications is hereby incorporated by reference herein and made a part of this specification.

BACKGROUND

1. Field of the Application

The application relates to a display device, and more particularly, to a touch display device.

2. Description of Related Art

As information technology, wireless mobile communication and information appliances have been rapidly developed and applied, to achieve more convenience, more compact and light volume and more user-friendly designs, various information products have changed from using conventional input devices such as key boards or mice to using touch input methods. For instance, a mobile electronic product, such as a mobile phone, a tablet PC or so forth, is a touch display device combining a touch panel and a display.

When driving or doing sports, in order to reduce influences of external light on the eyes, a user of the touch display device may wear polarized sunglasses to view an image. However, because of inhomogeneous phase difference reasons, the user would see inhomogeneous color patterns. When using the touch display device horizontally, a polarization direction of the image light may even be orthogonal to a polarization direction of the polarized sunglasses, thereby causing the user to see a complete black screen. The aforementioned situations are all causing inconveniences to the user.

SUMMARY OF THE APPLICATION

The application provides a touch display device with a phase retardation protection layer. A user can still view a uniform and clear image even if wearing a polarizing device.

The application provides a touch display device with a phase retardation planarization layer. A user can still view a uniform and clear image even if wearing a polarizing device.

The application provides a touch display device including a display module and a touch module. The touch module is disposed above the display module, and the touch module includes a transparent cover, a touch electrode layer and a phase retardation protection layer. The display module is configured to provide an image light. The touch electrode layer is disposed on the transparent cover and between the display module and the transparent cover. The phase retardation protection layer covers on the touch electrode layer, wherein polarization direction of the image light provided by the display module is changed after passing through the phase retardation protection layer.

The application provides a touch display device including a display module and a touch module. The touch module is disposed above the display module, and the touch module includes a transparent cover, a touch electrode layer and a phase retardation planarization layer. The display module is configured to provide an image light. The touch electrode layer is disposed on the transparent cover and between the display module and the transparent cover. The phase retardation planarization layer is disposed between the touch electrode layer and the transparent cover, wherein a polarization direction of the image light provided by the display module is changed after passing through the phase retardation planarization layer.

According to the foregoing, the touch display device of the application uses the phase retardation layer to change the polarization direction of the image light after the image light passing through the phase retardation layer, and thus the user can still view the uniform and clear image even if wearing the polarizing device.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
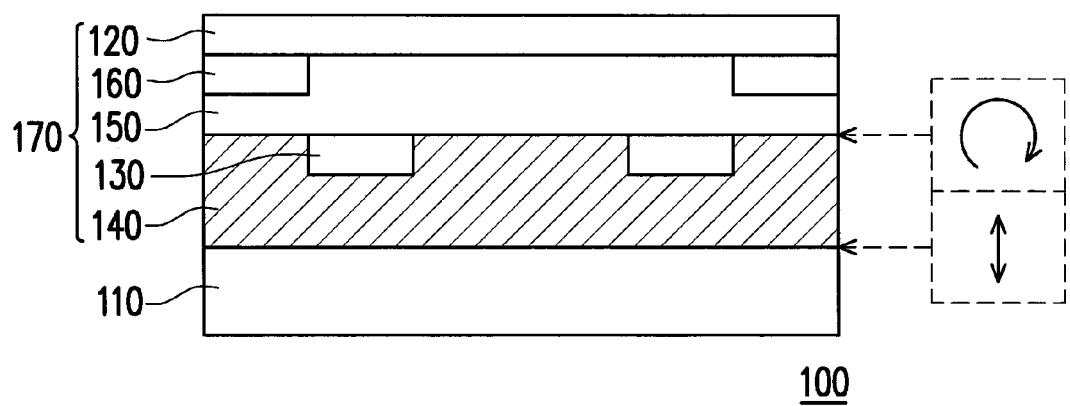
FIG. 1 is a schematic diagram illustrating a touch display device and a polarization state of an image light according to an embodiment of the invention.

FIG. 1 is a schematic diagram illustrating a touch display device and a polarization state of an image light according to an embodiment of the invention. Referring to FIG. 1, a touch display device 100 includes a display module 110 and a touch module 170. The touch module 170 is disposed above the display module 110, and the touch module 170 includes a transparent cover 120, a touch electrode layer 130 and a phase retardation protection layer 140. In the present embodiment, the touch display device 100, for example, is a smart phone or a tablet PC, and the display module 110 is configured to provide an image light for rendering an image. The touch electrode layer 130 is disposed on the transparent cover 120 and between the display module 110 and the transparent cover 120. With the touch electrode layer 130, a user may operate the touch display device 100 via a touch method. The phase retardation protection layer 140 covers on the touch electrode layer 130 and may protect the touch electrode layer 130. The image light provided by the display module 110, after passing through the phase retardation protection layer 140, the touch electrode layer 130 and the transparent cover 120, may render the image for the user to view. In the present embodiment, the display module 110 and the touch module 170 are assembled together by adhering; however, in other embodiments, the display module 110 and the touch module 170 may also be separated.

In addition, the touch electrode layer 130, for example, is a single-layer circuit formed with a transparent conductive material. The transparent conductive material, for example, is Indium Tin Oxide (ITO), Indium Zinc Oxide (IZO), Al doped zinc oxide (AZO), Indium Oxide or a combination thereof.

Referring to FIG. 1, dashed boxes at the right side of FIG. 1 show the polarization state of the image light indicated by dashed arrows. As illustrated in FIG. 1, a polarization direction of the image light provided by the display module 110 is changed after passing through the phase retardation protection layer 140. In the present embodiment, the phase retardation protection layer 140 is a ¼ phase retardation protection layer 140, and the image light provided by the display module 110 is a linearly polarized light. As shown in the dashed boxes at the right side of FIG. 1, after passing through the ¼ phase retardation protection layer 140, the polarization state of the image light is converted from linearly polarized to circularly polarized. As such, when the user wears a polarizing device such as a polarized sunglasses to view the touch display device 100, the polarization state of the image light from the touch display device 100 is circularly polarized and may pass through the sun glasses, and therefore, the image is not affected by the polarization state of the image light when viewing by the user.

In the present embodiment, the touch module 170 may selectively to further include a planarization layer 150 disposed between the touch electrode layer 130 and the transparent cover 120. As illustrate in FIG. 1, the touch display device 100 may include a decoration layer 160 disposed on the transparent cover 120, located around the touch display device 100 and has decorative and shading effects. However, the touch electrode layer 130 is directly formed on the uneven transparent cover 120 having the decoration layer 160, and this increases a production difficulty and increases a probability of occurring disconnection. Therefore, the planarization layer 150 is firstly been covered on the decoration layer 160, so as to facilitate in increasing a production yield of the touch electrode layer 130.

Figure 2A:
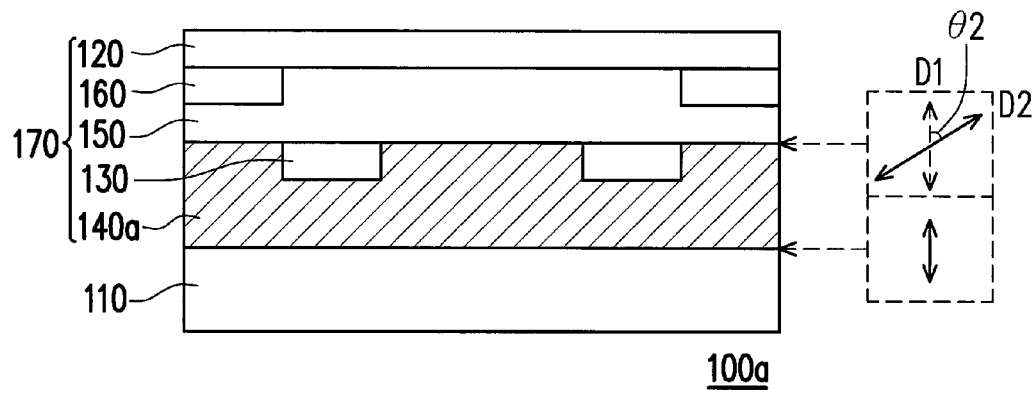
FIG. 2A is a schematic diagram illustrating a touch display device and a polarization state of an image light according to another embodiment of the invention.

FIG. 2A is a schematic diagram illustrating a touch display device and a polarization state of an image light according to another embodiment. Herein, it is to be explained that, FIG. 2A adopts component notations and part of the contents from FIG. 1, wherein the same notations are used for representing the same or similar components, and descriptions of the same technical contents are omitted. The descriptions regarding to the omitted part may be referred to the previous embodiments, and thus is not repeated herein. A main difference between the embodiment of FIG. 2A and the embodiment of FIG. 1 is that, in the present embodiment, a phase retardation protection layer 140a is a ½ phase retardation protection layer. A phase difference produced after the image light passing through the phase retardation protection layer 140a is different from that of the embodiment of FIG. 1, thereby resulting in a different polarization state.

Figure 2B:
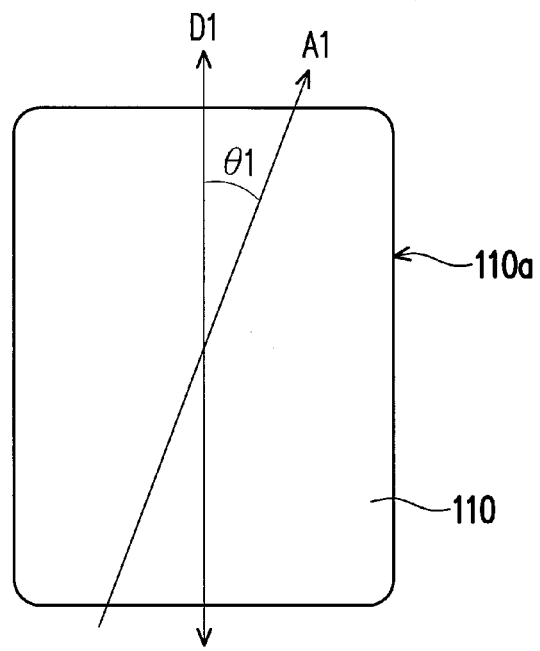
FIG. 2B is a schematic diagram illustrating an angle between a retardation main axis of a phase retardation protection layer and a linear polarization direction of the image light in FIG. 2A.

FIG. 2B is a schematic diagram illustrating an angle between a retardation main axis of a phase retardation protection layer and a linear polarization direction of the image light in FIG. 2A. As illustrated in FIG. 2B, in the present embodiment, an angle θ1 between a retardation main axis A1 of the phase retardation protection layer 140a and a linear polarization direction D1 of the image light is substantially 22.5 degrees. In addition, in the present embodiment, the display module 110 is a rectangle, and the linear polarization direction D1 of the image light parallels to a longer side 110a of the display module 110. In other words, an angle between the retardation main axis A1 of the phase retardation protection layer 140a and the longer side 110a of the display module 110 is substantially 22.5 degrees. In the present embodiment, the retardation main axis A1 of the phase retardation protection layer 140a, for example, maintains the angle θ1 in a clockwise direction in relative to the linear polarization direction D1 of the image light, but the application is not limited thereto. The retardation main axis A1 of the phase retardation protection layer 140a may also maintain the angle θ1 in a counterclockwise direction in relative to the linear polarization direction D1 of the image light, and the angle between the two is 22.5 degrees.

Referring to FIG. 2A, dashed boxes at the right side of FIG. 2A show the polarization state of the image light indicated by dashed arrows. In the present embodiment, the image light is a linearly polarized light, and after the image light passing through the phase retardation protection layer 140a, an angle θ2 between a linear polarization direction D2 and the original linear polarization direction D1 is 45 degrees. In other words, an angle between the linear polarization direction D2 and the longer side 110a of the display module 110 is 45 degrees. As such, when the user wears the polarized sunglasses to view the touch display device 100a, the linear polarization direction D2 of the image light incident from the touch display device 100a to the sunglasses forms a 45 degree angle with the longer side 110a (as illustrated in FIG. 2B), and the user may view the touch display device 100a while placing the touch display device 100a vertically or horizontally, without being unable to view the image due to the linear polarization direction of the image light.

Figure 3:
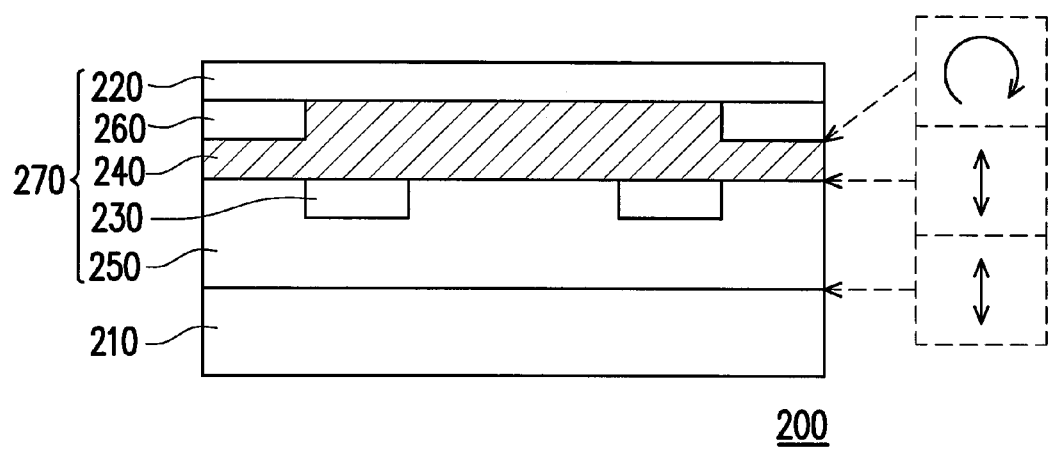
FIG. 3 is a schematic diagram illustrating a touch display device and a polarization state of an image light according to yet another embodiment of the invention.

FIG. 3 is a schematic diagram illustrating a touch display device and a polarization state of an image light according to yet another embodiment. Referring to FIG. 3, a touch display device 200 includes a display module 210 and a touch module 270. The touch module 270 is disposed above the display module 210, and the touch module 270 includes a transparent cover 220, a touch electrode layer 230 and a phase retardation planarization layer 240. In the present embodiment, the touch display device 200, for examples, is a smart phone or a tablet PC, and the display module 210 is configured to provide an image light to show an image. The touch electrode layer 230 is disposed on the transparent cover 220 and between the display module 210 and the transparent cover 220. With the touch electrode layer 230, the user may adopt a touch method to operate the touch display device 200. The phase retardation planarization layer 240 is disposed between the touch electrode layer 230 and the transparent cover 220.

Referring to FIG. 3, dashed boxes at the right side of FIG. 3 show the polarization state of the image light indicated by dashed arrows. As illustrated in FIG. 3, a polarization direction of the image light provided by the display module 210 is changed after passing through the phase retardation planarization layer 240. In the present embodiment, the phase retardation planarization layer 240 is a ¼ phase retardation planarization layer, and the polarization state of the image light provided by the display module 210 is linearly polarized. As shown in the dashed boxes at the right side of FIG. 3, after passing through the phase retardation planarization layer 240, the polarization state of the image light is converted from linearly polarized to circularly polarized. As such, when the user wears the polarized sunglasses to view the touch display device 200, the polarization state of the image light from the touch display device 200 is circularly polarized and may pass through the sun glasses, and therefore, the image is not affected by the polarization state of the image light when viewing by the user.

In the present embodiment, the touch module 270 further includes a protection layer 250 covering on the touch electrode layer 230 to protect the touch electrode layer 230. In addition, the touch display device 200 further includes a decoration layer 260 disposed between the transparent cover 220 and the phase retardation planarization layer 240. The decoration layer 260 may be disposed around the touch display device 200 and has decorative and shading effects. However, the touch electrode layer 230 is directly formed on the uneven transparent cover 220 having the decoration layer 260, and this increases the production difficulty and increases the probability of occurring disconnection. Therefore, the phase retardation planarization layer 240 is firstly been covered on the decoration layer 260, so as to facilitate in increasing the production yield of the touch electrode layer 230. In the present embodiment, the phase retardation planarization layer 240 may be made by coating a photoresist material or an organic material.

Figure 4A:
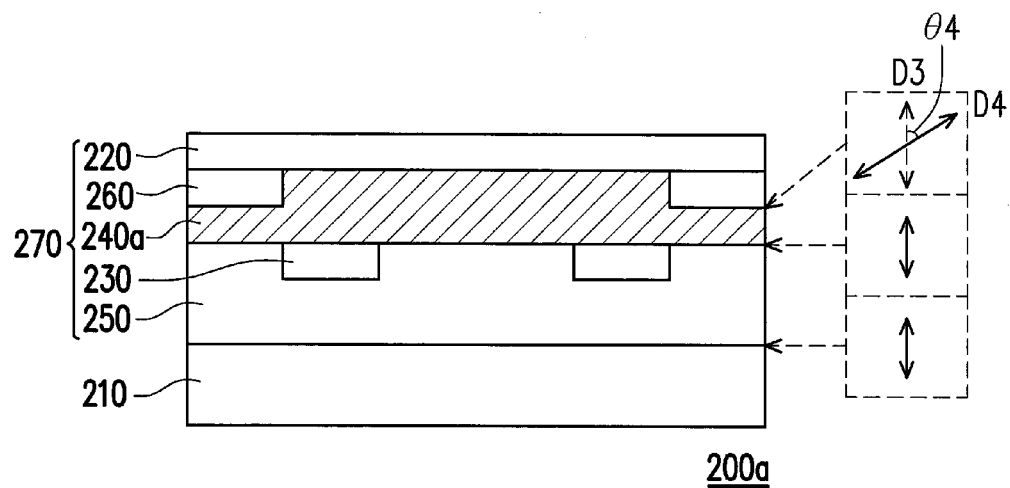
FIG. 4A is a schematic diagram illustrating a touch display device and a polarization state of an image light according to still another embodiment of the invention.

FIG. 4A is a schematic diagram illustrating a touch display device and a polarization state of an image light according to still another embodiment. Herein, it is to be explained that, FIG. 4A adopts component notations and part of the contents from FIG. 3, wherein the same notations are used for representing the same or similar components, and descriptions of the same technical contents are omitted. The descriptions regarding to the omitted part may be referred to the previous embodiments, and thus is not repeated herein. A main difference between the embodiment of FIG. 4A and the embodiment of FIG. 3 is that, a phase retardation planarization layer 240a is a ½ phase retardation planarization layer. A phase difference produced after the image light passing through the phase retardation planarization layer 240a is different from that of the embodiment of FIG. 3, thereby resulting in a different polarization state.

Figure 4B:
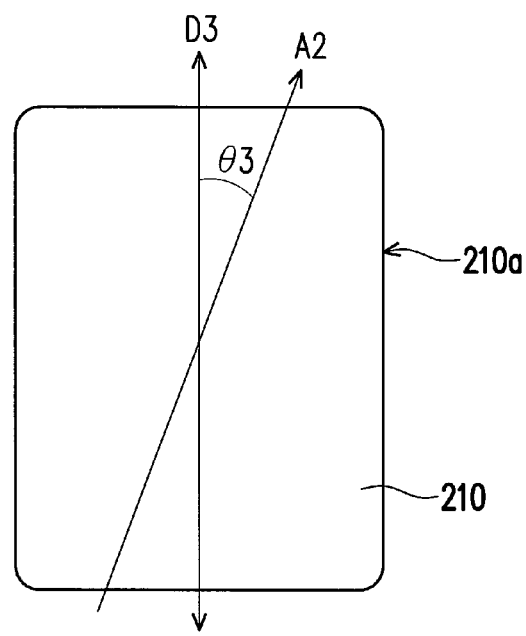
FIG. 4B is a schematic diagram illustrating an angle between a retardation main axis of a phase retardation planarization layer and a linear polarization direction of the image light in FIG. 4A.

FIG. 4B is a schematic diagram illustrating an angle between the retardation main axis A2 of the phase retardation planarization layer 240a and a linear polarization direction of the image light in FIG. 4A. As illustrated in FIG. 4B, in the present embodiment, an angle θ3 between a retardation main axis A2 of the phase retardation planarization layer 240a and a linear polarization direction D3 of the image light is substantially 22.5 degrees. In addition, in the present embodiment, the display module 210 is a rectangle, and the linear polarization direction D3 of the image light is parallel to a longer side 210a of the display module 210. In other words, an angle between the linear polarization direction D3 of the image light and the longer side 210a of the display module 210 is substantially 22.5 degrees. In the present embodiment, the retardation main axis A2 of the phase retardation planarization layer 240a, for example, maintains the angle θ3 in a clockwise direction in relative to the linear polarization direction D3 of the image light, but the application is not limited thereto. The retardation main axis A2 of the phase retardation planarization layer 240a may also maintain the angle θ3 in a counterclockwise direction in relative to the linear polarization direction D3, and the angle between the two is 22.5 degrees.

Referring to FIG. 4A, dashed boxes at the right side of FIG. 4A show the polarization state of the image light indicated by dashed arrows. The image light provided by the display module 210 is incident into the phase retardation planarization layer 240a with the linear polarization state. After passing through the phase retardation planarization layer 240a, an angle θ4 between a linear polarization direction D4 of the image light and the original linear polarization direction D3 is 45 degrees. In other words, an angle between the linear polarization direction D4 of the image light and the longer side 210a of the display module 210 is 45 degrees. As such, when the user wears the polarized sunglasses to view the touch display device 200a, the linear polarization direction D4 of the image light incident from the touch display device 200a to the sunglasses forms a 45 degree angle with the longer side 210a (as illustrated in FIG. 4B), and the user may view the touch display device 200a while placing the touch display device 200a vertically or horizontally, without being unable to view the image due to the linear polarization direction of the image light.

Figure 5:
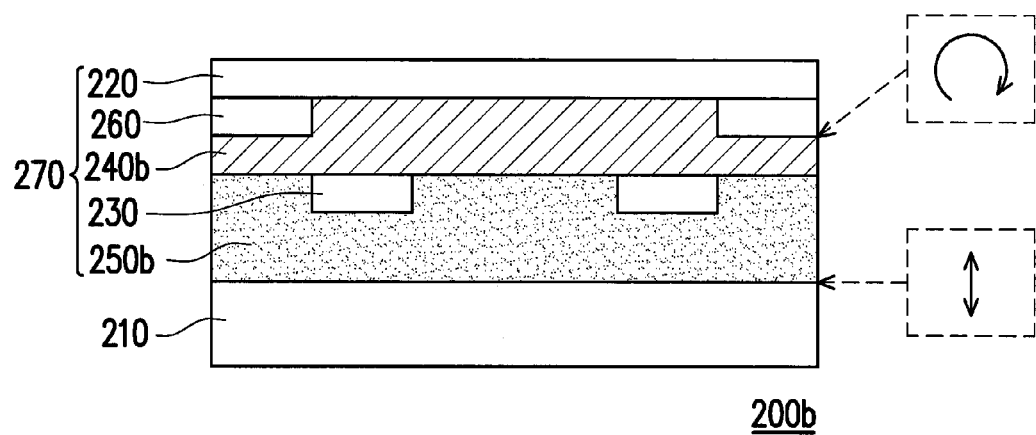
FIG. 5 is a schematic diagram illustrating a touch display device and a polarization state of an image light according to still another embodiment of the invention.

FIG. 5 is a schematic diagram illustrating a touch display device and a polarization state of an image light according to still another embodiment. Herein, it is to be explained that, FIG. 5 adopts component notations and part of the contents from FIG. 3, wherein the same notations are used for representing the same or similar components, and descriptions of the same technical contents are omitted. The descriptions regarding to the omitted part may be referred to the previous embodiments, and thus is not repeated herein.

A main difference between the embodiment of FIG. 5 and the embodiment of FIG. 3 is that, a protection layer 250b illustrated in FIG. 5 is a phase retardation protection layer; namely, the phase retardation planarization layer 240b and a protection layer 250b both have phase retardation functions. In the present embodiment, the phase retardation protection layer 250b is a ⅛ phase retardation protection layer, and the phase retardation planarization layer 240b is a ⅛ phase retardation planarization layer. After the image light passes from the display module 210 sequentially through the phase retardation protection layer 250b and the phase retardation planarization layer 240b, phase retardation effects produced by the phase retardation protection layer 250b and the phase retardation planarization layer 240b may be accumulated to achieve a ¼ phase retardation effect. As shown in the dashed boxes at the right side of FIG. 5, after passing through the phase retardation protection layer 250b and the phase retardation planarization layer 240b, the polarization state of the image light is converted from linearly polarized to circularly polarized. As such, the image is not affected by the polarization state of the image light when viewing by the user.

Figure 6A:
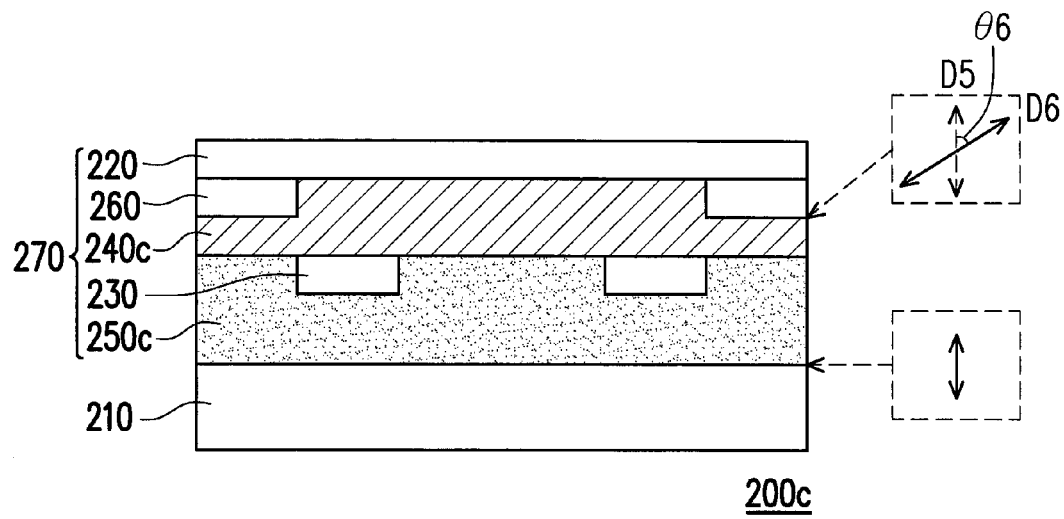
FIG. 6A is a schematic diagram illustrating a touch display device and a polarization state of an image light according to still another embodiment of the invention.
Figure 6B:
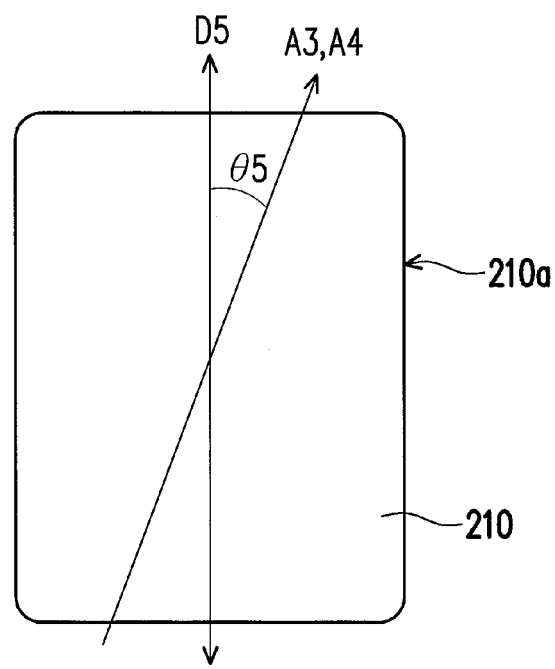
FIG. 6B is a schematic diagram illustrating an angle between a retardation main axis of a phase retardation planarization layer and a linear polarization direction of the image light in FIG. 6A.

FIG. 6A is a schematic diagram illustrating a touch display device and a polarization state of an image light according to still another embodiment. FIG. 6B is a schematic diagram illustrating an angle between a retardation main axis of a phase retardation planarization layer and a linear polarization direction of the image light in FIG. 6A. Referring to FIG. 6A and FIG. 6B at the same time. The embodiment of FIG. 6A is substantially similar to the embodiment of FIG. 5, and a main difference between the two is that, in the present embodiment, a phase retardation protection layer 250c is a ¼ phase retardation protection layer and a phase retardation planarization layer 240c is a ¼ phase retardation planarization layer. Moreover, angles θ5 between retardation main axes A3, A4 and a linear polarization direction D5 of image light are both 22.5 degrees. Similarly, after the image light sequentially passing through the phase retardation protection layer 250c and the phase retardation planarization layer 240b, phase retardation effects produced by the phase retardation protection layer 250c and the phase retardation planarization layer 240b may be accumulated to achieve a ½ phase retardation effect. As illustrated in FIG. 6B, after passing through the phase retardation planarization layer 240c, an angle θ6 between a linear polarization direction D6 of the image light and the original linear polarization direction D5 is 45 degrees. As such, when the user wears the polarized sunglasses to view the touch display device 200c, the polarization state of the image light from the touch display device 200c is circularly polarized and may pass through the sun glasses, and therefore, the image is not affected by the polarization state of the image light when viewing by the user.

In the various embodiments and drawings described above, the display module and the touch module may be combined together via an adhesive layer (not shown). However, in other embodiments, the display module and the touch module may also be independent and separated.

In summary, the touch module in the touch display device of the application has the phase retardation protection layer or the phase retardation planarization layer, so that the polarization state of the image light is changed after passing through the phase retardation protection layer or the phase retardation planarization layer, and thus the user can view a uniform and clear image when wearing the polarizing device. The phase retardation protection layer or the phase retardation planarization layer may have a ¼ phase difference or a ½ phase difference. As compared to adopting an independent phase retardation sheet, the touch module in the touch display device of the application can further reduce a thickness thereof by adopting the phase retardation protection layer or the phase retardation planarization layer.

When the phase retardation protection layer or the phase retardation planarization layer has the ¼ phase difference, the image light, after passing through the phase retardation protection layer or the phase retardation planarization layer, is changed from the linear polarization state to the circular polarization state. When the phase retardation protection layer or the phase retardation planarization layer has the ½ phase difference, the angle between the retardation main axis thereof and the of polarization direction the image light is 22.5 degrees, so that after the image light passing through the phase retardation protection layer or the phase retardation planarization layer, the angle between the resulting polarization direction and the original polarization direction is 45 degrees. In addition, the touch display device may also include the phase retardation protection layer and the phase retardation planarization layer at the same time, thus having a favorable design flexibility.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A touch display device comprising:
   a display module configured to provide an image light;
   a touch module disposed above the display module, the touch module comprising:
   a transparent cover;
   a touch electrode layer disposed on the transparent cover and between the display module and the transparent cover; and
   a phase retardation protection layer covering on and being directly connected with the touch electrode layer, wherein a polarization direction of the image light provided by the display module is changed after passing through the phase retardation protection layer.

2. The touch display device as recited in claim 1, wherein the phase retardation protection layer is a ¼ phase retardation protection layer.

3. The touch display device as recited in claim 1, wherein the phase retardation protection layer is a ½ phase retardation protection layer, and an angle between a retardation main axis of the ½ phase retardation protection layer and a linear polarization direction of the image light is substantially 22.5 degrees.

4. The touch display device as recited in claim 3, wherein the display module is a rectangle, and the linear polarization direction of the image light is parallel to a longer side of the display module.

5. The touch display device as recited in claim 1, wherein the touch module further comprises:
   a planarization layer disposed between the touch electrode layer and the transparent cover.

6. The touch display device as recited in claim 5, wherein the planarization layer is a phase retardation planarization layer.

7. A touch display device comprising:
   a display module configured to provide an image light;
   a touch module disposed above the display module, the touch module comprising:
   a transparent cover;
   a touch electrode layer disposed on the transparent cover and between the display module and the transparent cover; and
   a phase retardation planarization layer disposed between the touch electrode layer and the transparent cover and being directly connected with the touch electrode layer, wherein a polarization direction of the image light provided by the display module is changed after passing through the phase retardation planarization layer.

8. The touch display device as recited in claim 7, wherein the phase retardation planarization layer is a ¼ phase retardation planarization layer.

9. The touch display device as recited in claim 7, wherein the phase retardation planarization layer is a ½ phase retardation planarization layer, and an angle between a retardation main axis of the ½ phase retardation planarization layer and a linear polarization direction of the image light is substantially 22.5 degrees.

10. The touch display device as recited in claim 9, wherein the display module is a rectangle, and the linear polarization direction of the image light is parallel to a longer side of the display module.

11. The touch display device as recited in claim 7, wherein the touch module further comprises a protection layer covering on the touch electrode layer.

* * * * *